(12) United States Patent
Kamath et al.

(10) Patent No.: US 6,675,164 B2
(45) Date of Patent: Jan. 6, 2004

(54) PARALLEL OBJECT-ORIENTED DATA MINING SYSTEM

(75) Inventors: Chandrika Kamath, Dublin, CA (US); Erick Cantu-Paz, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 292 days.

(21) Appl. No.: 09/877,685

(22) Filed: Jun. 8, 2001

(65) Prior Publication Data

US 2002/0194159 A1 Dec. 19, 2002

(51) Int. Cl.[7] .............................................. G06F 17/30
(52) U.S. Cl. ............................................. 707/6; 706/45
(58) Field of Search ................................ 707/6; 706/45

(56) References Cited

U.S. PATENT DOCUMENTS

| | | | | |
|---|---|---|---|---|
| 4,752,916 | A | * 6/1988 | Loewenthal | 367/24 |
| 5,692,107 | A | 11/1997 | Simoudis et al. | 395/50 |
| 5,758,147 | A | 5/1998 | Chen et al. | 395/606 |
| 5,787,425 | A | * 7/1998 | Bigus | 707/6 |
| 5,875,285 | A | * 2/1999 | Chang | 706/25 |
| 5,933,818 | A | * 8/1999 | Kasravi et al. | 706/12 |
| 6,049,861 | A | 4/2000 | Bird et al. | 712/28 |
| 6,067,542 | A | * 5/2000 | Carino, Jr. | 707/4 |
| 6,108,609 | A | * 8/2000 | Qian et al. | 702/66 |
| 6,169,981 | B1 | * 1/2001 | Werbos | 706/23 |
| 6,278,965 | B1 | * 8/2001 | Glass et al. | 703/22 |
| 6,349,290 | B1 | * 2/2002 | Horowitz et al. | 705/35 |
| 6,430,547 | B1 | * 8/2002 | Busche et al. | 707/1 |
| 6,470,333 | B1 | * 10/2002 | Baclawski | 707/3 |
| 6,523,019 | B1 | * 2/2003 | Borthwick | 706/45 |
| 2002/0053078 | A1 | * 5/2002 | Holtz et al. | 725/14 |
| 2002/0169788 | A1 | * 11/2002 | Lee et al. | 707/104.1 |

OTHER PUBLICATIONS

Ng et al, On Reconfiguring Query Execution Plans in Distributed Object–Relational DBMS, Parallel and Distributed Systems, 1998, Proc. 1998, Int'l Conf., Dec. 14–16, 1998, pp 59–66.*

S. K. Murthy, et al., "A System for Induction of Oblique Decision Trees," 1994, Journal of Artificial Intelligence Research 2 (1994), pp. 1–32.

(List continued on next page.)

Primary Examiner—Wayne Amsbury
(74) Attorney, Agent, or Firm—Eddie E. Scott; Alan H. Thompson

(57) ABSTRACT

A data mining system uncovers patterns, associations, anomalies and other statistically significant structures in data. Data files are read and displayed. Objects in the data files are identified. Relevant features for the objects are extracted. Patterns among the objects are recognized based upon the features. Data from the Faint Images of the Radio Sky at Twenty Centimeters (FIRST) sky survey was used to search for bent doubles. This test was conducted on data from the Very Large Array in New Mexico which seeks to locate a special type of quasar (radio-emitting stellar object) called bent doubles. The FIRST survey has generated more than 32,000 images of the sky to date. Each image is 7.1 megabytes, yielding more than 100 gigabytes of image data in the entire data set.

33 Claims, 5 Drawing Sheets

OTHER PUBLICATIONS

S. G. Chang, et al., "Adaptive Wavelet Thresholding for Image Denoising and Compression," Oct. 1997, IEEE Transactions on Image Processing, pp. 1–35.

A. Bruce, et al., "Applied Wavelet Analysis with S–PLUS," 1996, http://www.springer_ny.com/catalog/np1jul96np/DATA/0–387–94714–0.html, 1 page.

K. Alsabti, et al., "Clouds: A Decision Tree Classifier for Large Datasets," Oct. 27, 1998, pp. 1–34.

C. Kamath, et al., "On the design and implementation of a parallel, object–oriented, image processing toolkit," Center for Applied Scientific Computing, Lawrence Livermore National Laboratory, 2000, 13 pages.

P.B. Duffy, et al., "Effect of Missing Data on Estimates of Near–Surface Temperature Change Since 1900," 2000, UCRL–JC–140272–ABS, 2 pages.

R. Todd Ogden, "Essential Wavelets for Statistical Applications and Data Analysis," 1997, Birkhauser, 16 pages.

D. Donoho, et al., "Ideal Spatial Adaptation by Wavelet Shrinkage," 1994, Biometrika, 81, 3. pp. 425–455.

R. Kohavi, et al., "MLC++: A Machine Learning Library in C++," 1994, Appears in Tools with AI '94, 4 pages.

Imola K. Fodor, et al., "On denoising images using wavelet-based statistical techniques," 2001, IEEE Transactions in Image Provessing vol. XX, No. Y, 2001, draft, pp. 100–125.

C. Kamath, et al, "On the design and implementation of a parallel, object–oriented, image processing toolkit," Jul. 2000, Parallel and Distributed Methods for Image Processing, IV, 12 pages.

C. Kamath, et al., "On the Design of a Parallel Object–Oriented Data Mining Toolkit," 2000, Workshop on Distributed and Parallel Knowledge Discovery, Boston, MA Aug., 20, 2000, 16 pages.

M. Joshi, "ScalParC: A New Scalable and Efficient Parallel Classification Algorithm for Mining Large Datasets," Apr. 1998, 20 pages.

E. Cantu–Paz, et al., "Using Evolutionary Algorithms to Induce Oblique Decision Trees," 2000, Center for Applied Scientific Computing, Lawrence Livermore National Laboratory, 11 pages.

D. Donoho, et al., "Wavelab 802 for Matlab5.x," http://www–stat.standord.edu/~wavelab, Oct. 3, 1999, 3 pages.

A. Bruce, et al., "WaveShrink: Shrinkage Functions and Thresholds," StatSci Division, MathSoft, Inc., 1995, 12 pages.

F. Ruggeri, et al., "A Bayesian Decision Theoretic Approach to Wavelet Thresholding," CNR–IAMI and Duke University, preprint 1995 (published date 1998), 17 pages.

* cited by examiner

PARALLEL OBJECT-ORIENTED DATA MINING SYSTEM

CROSS REFERENCE TO RELATED APPLICATIONS

Related subject matter is disclosed and claimed in the following commonly owned, copending, U.S. Patent Applications, "PARALLEL OBJECT-ORIENTED, DENOISING SYSTEM USING WAVELET MULTIRESOLUTION ANALYSIS," by Chandrika Kamath, Chuck H. Baldwin, Imola K. Fodor, and Nu Ai. Tang, patent application number 09/877,962 filed Jun. 8, 2001 , and "PARALLEL OBJECT-ORIENTED DECISION TREE SYSTEM." by Chandrika Kamath and Erick Cantu-Paz, patent application number 09/877,570 filed Jun. 6, 2001, which are hereby incorporated by reference in their entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to data mining and more particularly to parallel object-oriented data mining.

2. State of Technology

U.S. Pat. No. 5,692,107 for a method for generating predictive models in a computer system by Simoudis et al, patented Nov. 25, 1997 provides the following information, "Accurate forecasting relies heavily upon the ability to analyze large amounts of data. This task is extremely difficult because of the sheer quantity of data involved and the complexity of the analyses that should be performed. The problem is exacerbated by the fact that the data often resides in multiple databases, each database having different internal file structures. Rarely is the relevant information explicitly stored in the databases. Rather, the important information exists only in the hidden relationships among items in the databases. Recently, artificial intelligence techniques have been employed to assist users in discovering these relationships and, in some cases, in automatically discovering the relationships. Data mining is a process that uses specific techniques to find patterns in data, allowing a user to conduct a relatively broad search of large databases for relevant information that may not be explicitly stored in the databases. Typically, a user initially specifies a search phrase or strategy and the system then extracts patterns and relations corresponding to that strategy from the stored data. These extracted patterns and relations can be: (1) used by the user, or data analyst, to form a prediction model; (2) used to refine an existing model; and/or (3) organized into a summary of the target database. Such a search system permits searching across multiple databases. There are two existing forms of data mining: top-down; and bottom-up. Both forms are separately available on existing systems. Top-down systems are also referred to as "pattern validation," "verification-driven data mining" and "confirmatory analysis." This is a type of analysis that allows an analyst to express a piece of knowledge, validate or validate that knowledge, and obtain the reasons for the validation or invalidation. The validation step in a top-down analysis requires that data refuting the knowledge as well as data supporting the knowledge be considered. Bottom-up systems are also referred to as "data exploration." Bottom-up systems discover knowledge, generally in the form of patterns, in data. Existing systems rely on the specific interface associated with each database, which further limits a user's ability to dynamically interact with the system to create sets of rules and hypotheses than can be applied across several databases, each having separate structures. For large data problems, a single interface and single data mining technique significantly inhibits a user's ability to identify all appropriate patterns and relations. The goal of performing such data mining is to generate a reliable predictive model that can be applied to data sets. Furthermore, existing systems require the user to collect and appropriately configure the relevant data, frequently from multiple and diverse data sources. Little or no guidance or support for this task is produced. Thus, there remains a need for a system that permits a user to create a reliable predictive model using data mining across multiple and diverse databases."

U.S. Pat. No. 5,758,147 for efficient information collection method for parallel data mining by Chen et al, patented May 26, 1998 provides the following information, "The importance of database mining is growing at a rapid pace. Progress in bar-code technology has made it possible for retail organizations to collect and store massive amounts of sales data. Catalog companies can also collect sales data from the orders they receive. A record in such data typically consists of the transaction date, the items bought in that transaction, and possibly the customer-id if such a transaction is made via the use of a credit card or customer card. Analysis of past transaction data can provide very valuable information on customer buying behavior, and thus improve the quality of business decisions such as: what to put on sale; which merchandise should be placed on shelves together; and how to customize marketing programs; to name a few. It is, however, essential to collect a sufficient amount of sales data before any meaningful conclusions can be drawn therefrom. It is therefore important to devise efficient methods of communicating and mining the 'gold' in these often enormous volumes of partitioned data. The most important data mining problem is mining association rules. By mining association rules it is meant that given a database of sales transactions, the process of identifying all associations among items such that the presence of some items in a transaction will imply the presence of other items in the same transaction. It is known that mining association rules can be decomposed into two subproblems. First, all sets of items (itemsets) that are contained in a sufficient number of transactions above a minimum (support) threshold are identified. These itemsets are referred to as large itemsets. Once all large itemsets are obtained, the desired association rules can be generated therefrom in a straightforward manner. Database mining in general requires progressive knowledge collection and analysis based on a very large transaction database. When the transaction database is partitioned across a large number of nodes in a parallel database environment, the volume of inter-node data transmissions required for reaching global decisions can be prohibitive, thus significantly compromising the benefits normally accruing from parallelization. It is therefore important to devise efficient methods for mining association rules in a parallel database environment."

U.S. Pat. No. 5,787,425 for an object-oriented data mining framework mechanism by Joseph Phillip Bigus, patented Jul. 28, 1998 provides the following description, "The development of the EDVAC computer system of 1948 is often cited as the beginning of the computer era. Since that time, computer systems have evolved into extremely sophisticated devices, capable of storing and processing vast amounts of data. As the amount of data stored on computer systems has increased, the ability to interpret and understand the information implicit in that data has diminished. In the past, data was stored in flat files, then hierarchical and network data based systems, and now in relational or object oriented databases. The primary method for analyzing that data has been to form well structured queries, for example using SQL (Structured Query Language), and then to perform simple aggregations or hypothesis testing against that data. Recently, a new technique called data mining has been developed, which allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information. Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground."

U.S. Pat. No. 6,049,861 for locating and sampling of data in parallel processing systems by Bird et al, patented Apr. 11, 2000, provides the following information, "Parallel processing techniques are known, in which a plurality of data processing units are provided and a separate processing unit is assigned, for example, to its own mutually exclusive set of local data items to process. This can greatly reduce the overall processing time as compared with serial processing. The 'nodes' of a parallel processing system are the separate processing units, which each have their own processor and their own storage (or at least access to shared storage). Two models exist for processing data which is shared across a plurality of nodes of a parallel processing system. That is, where a dataset is to be processed in parallel, it is loaded into the storage of the plurality of parallel processing units of the system. In a first one of these models, known as the 'master-slave' model, processing is under the control of a master node, which may have its own share of the data. There is generally no more than one master node. The other nodes are referred to as slaves. In the second model, there is generally no one node which is in control—all nodes are communicating with each other in an 'any-to-any' model. With both of these models, if information is to be extracted from a dataset by selecting data items in a specific sequence and performing operations on the selected data, while ensuring adequate coverage of the data on each of the nodes, then a fast and efficient method is required for locating the required data items. One possible method of locating specific data items within a dataset which is shared across multiple nodes involves polling of all the individual nodes. A first node (generally a controller node) sends a query to all nodes to determine which has, say, item number 15 of the set of data items. One of the nodes should reply with a confirmation that it has this required item. These inter-node communication steps are repeated for each required data item. However, such communication between the nodes entails both undesirable overheads and delays. Furthermore, associated with such inter-node communication is the necessity for status and error checking plus corrective operations to ensure that any communication failures cannot result in out-of-step processing. This entails a significant additional processing overhead. It is thus desirable to avoid any unnecessary communication between the nodes and so a method and a system are required which are not reliant on polling of individual nodes to determine the location of a required data item. Although polling has these disadvantages, there is also a significant problem with locating and sampling of data items in a parallel system if polling is not used. Difficulties arise because the locations of data items within a dataset which is shared across a number of nodes are dependent on the number of nodes available (or the number selected from the available nodes) for performance of a particular operation and on the chosen type of data partitioning, both of which may be subject to change. The number of nodes across which the dataset is shared may vary, for example, because a number of nodes which were available when an operation was performed for a first time may be unavailable when the operation is subsequently re-run. The data may also be partitioned in different ways across the nodes according to a data analyst's selection. For example, data items may be striped across a number of nodes or each node may hold a contiguous block of data. The analyst may wish to change the partitioning of the dataset across the nodes when an operation is repeated (for example, because of temporal trends identified when the operation was first performed). Thus, each time a particular operation is repeated by the parallel processing system, data items may be located on different nodes than when the operation was previously performed. This makes locating of a particular data item and reproducible sampling of the dataset without polling of all nodes difficult. A second alternative which may be considered is to provide a look-up mapping table on each node which identifies the items held there (for example, listing their global item numbers within the dataset as a whole and corresponding local item numbers). A master node or every node of the system can be provided with a full list of which nodes hold which items. This is unacceptable, since for any large size database where data mining is likely to be used the data item location tables will also be very large and will consume far too much of the available storage space. Also, generating the look-up tables entails significant overhead. If efficient reproducible sampling is to be achieved, then there is a need for methods and systems which enable locating of particular selected data items despite any changes to the partitioning of the data set across a variable number of nodes. No method or system has previously been made available which provides efficient automatic determination by a single node of a parallel processing system of the location of items of a dataset which is shared across the system nodes, which does not involve polling of other nodes and which takes account of changes to the data partitioning."

SUMMARY OF THE INVENTION

The present invention provides a data mining system that uncovers patterns, associations, anomalies and other statistically significant structures in data. The system comprises reading and displaying data files with the data files containing objects that have relevant features. The objects in the data files are identified. Relevant features for the objects are extracted. Patterns among the objects are recognized based upon the features.

An embodiment of the invention was successfully tested in the field of astrophysics where vast quantities of data are gathered during surveys of the sky. The embodiment was tested in examining data from the Faint Images of the Radio Sky at Twenty Centimeters (FIRST) sky survey. This test was conducted on data collected at the Very Large Array in New Mexico which seeks to locate a special type of quasar (radio-emitting stellar object) called bent doubles. The FIRST survey has generated more than 32,000 images of the sky to date. Each image is 7.1 megabytes, yielding more than 100 gigabytes of image data in the entire data set. Searching for bent doubles in this mountain of images is as daunting as searching for the needle in the proverbial haystack.

The present invention has an enormous number of uses. It provides a data mining system for scientific, engineering, business and other data. The system has applications which include, but are not limited to the following: astrophysics, detecting credit card fraud, assuring the safety and reliability of the nation's nuclear weapons, nonproliferation and arms control, climate modeling, the human genome effort, computer network intrusions, reveal consumer buying patterns, recognize faces, recognize eyes, recognize fingerprints, analyze optical characters, analyze the makeup of the universe, analyze atomic interactions, web mining, text mining, multimedia mining, and analyzing data gathered from simulations, experiments, or observations.

Embodiments of the present invention provide scientific researchers with tools for use in plowing through enormous data sets to turn up information that will help them better understand the world around us and assist them in performing a variety of scientific endeavors. Other embodiments of the present invention provide academic and business users with tools for use in plowing through enormous data sets to turn up information that will help them performing a variety of endeavors.

Another embodiment of the present invention is visualized for use in "The MACHO Project," which is a collaboration between scientists at the Mt. Stromlo & Siding Spring Observatories, the Center for Particle Astrophysics at the Santa Barbara, San Diego, & Berkeley campuses of the University of California, and the Lawrence Livermore National Laboratory. Applicants' primary aim was to test the hypothesis that a significant fraction of the dark matter in the halo of the Milky Way is made up of objects like brown dwarfs or planets: these objects have come to be known as MACHOs, for MAssive Compact Halo Objects. The signature of these objects is the occasional amplification of the light from extragalactic stars by the gravitational lens effect. The amplification can be large, but events are extremely rare: it is necessary to monitor photometrically several million stars for a period of years in order to obtain a useful detection rate.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
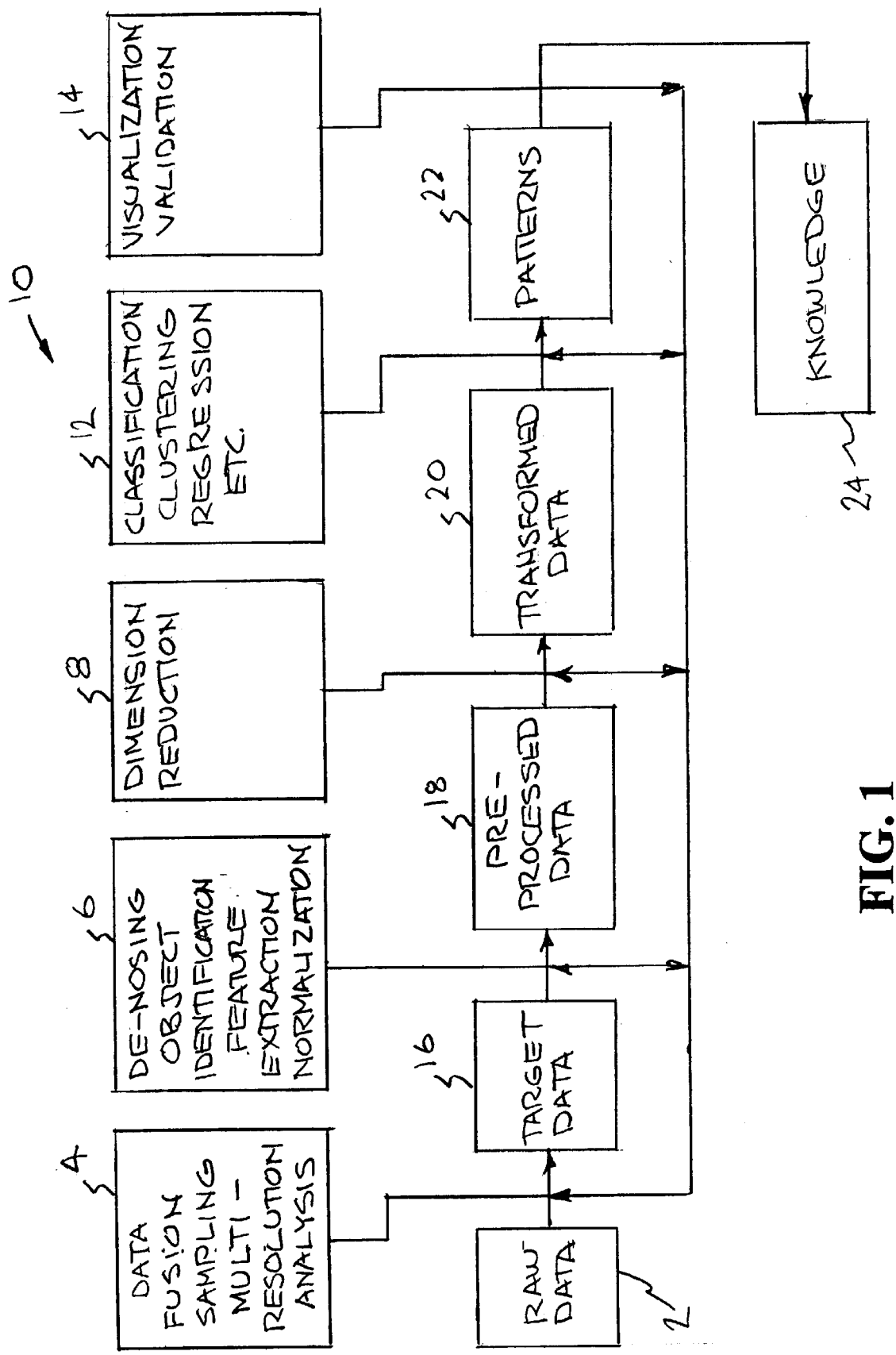
FIG. 1 is a flowchart demonstrating that data mining is an iterative and interactive process.

Referring now to the drawings, to the following detailed information, and to incorporated materials; a detailed description of the invention, including specific embodiments, are described. The description of the specific embodiments, together with the general description of the invention, serve to explain the principles of the invention. The scope of the invention is not intended to be limited to the particular forms disclosed and the invention covers all modifications, equivalents, and alternatives falling within the spirit and scope of the invention as defined by the claims.

The present invention provides a data mining system for large, complex data sets. The system can be used to uncover patterns, associations, anomalies and other statistically significant structures in data. The system has an enormous number of uses. It has applications which include, but are not limited to, astrophysics, detecting credit card fraud, assuring the safety and reliability of the nation's nuclear weapons, nonproliferation and arms control, climate modeling, the human genome effort, computer network intrusions, reveal consumer buying patterns, recognize faces, recognize eyes, recognize fingerprints, analyze optical characters, analyze the makeup of the universe, analyze atomic interactions, web mining, text mining, multi-media mining, and analyzing data gathered from simulations, experiments, or observations.

Embodiments of the present invention provide scientific researchers with tools for use in plowing through enormous data sets to turn up information that will help them better understand the world around us and assist them in performing a variety of scientific endeavors. Other embodiments of the present invention provides academic and business users with tools for use in plowing through enormous data sets to turn up information that will help them performing a variety of endeavors.

Data mining is a process concerned with uncovering patterns, associations, anomalies, and statistically significant structures and events in data. It can not only help us in knowledge discovery, that is, the identification of new phenomena, but it is also useful in enhancing our understanding of known phenomena. One of the key steps in data mining is pattern recognition, namely, the discovery and characterization of patterns in image and other high-dimensional data. A pattern is defined as an arrangement or an ordering in which some organization of underlying structure can be said to exist. Patterns in data are identified using measurable features or attributes that have been extracted from the data.

An embodiment of the present invention provides an object oriented system for mining data using tightly-coupled processors. One aspect of the embodiment is to focus on distributed memory architectures where each compute node has its own memory, and the nodes share only the interconnect. The architecture of such systems is scalable with increasing number of processors, making them well suited to mining massive data sets. Another embodiment of the present invention provides a system where each node of a distributed memory system is a symmetric multi-processor (SMP), that is, the system is a cluster of SMPs.

While there is broad agreement on what constitutes data mining, the tasks that are performed depend on the problem domain, the problem being solved, and the data. An embodiment of the present invention is targeted to problems arising from scientific applications, where the data is obtained from observations, experiments, or simulations. Scientific data analysis, while varied in scope, has several common challenges:

Feature Extraction From Low-Level Data—Science data can be either image data from observations or experiments, or mesh data from computer simulations of complex phenomena, in two and three dimensions, involving several variables. This data is available in a raw form, with values at each pixel in an image, or each grid point in a mesh. As the patterns of interest are at a higher level, additional features should be extracted from the raw data prior to pattern recognition.

Noisy Data—Scientific data, especially data from observations and experiments, is noisy. This noise may vary within an image, from image to image, and from sensor to sensor. Removing the noise from data, without affecting the signal is a challenging problem in scientific data sets.

Size of the Data—In one embodiment of the present invention, data sets range from moderate to massive, with the smallest being measured in hundreds of Gigabytes and the largest a few Terabytes. As more complex simulations are performed, the data is expected to grow to the Petabyte range.

Need for Data Fusion—Frequently, scientific data is collected from various sources, using different sensors. In order to use all available data to enhance the analysis, data fusion techniques are needed. This is a non-trivial task if the data was collected at different resolutions, using different wavelengths, under different conditions.

Lack of Labeled Data—Labeled examples in scientific data are usually generated manually. This tedious process is made more complicated as not all scientists may agree on a label for an object, or want the data mining algorithm to identify "interesting" objects, not just objects that are similar to the training set.

Data in Flat Files, Not Data Bases—Unlike commercial data, scientific data is rarely available in a cleaned state in data warehouses.

Mining Data as it is Being Generated—In the case of simulation data, scientists are interested in the behavior of the scientific phenomena as it changes with time. Sometimes, the time taken to output the result of the simulation at each time step may even exceed the simulation time itself. Since the simulations are run on large parallel computers, with hundreds to thousands of processors, some of the pre-processing is performed while the data is being generated, resulting in a smaller output. While this seems simple, a practical implementation is non-trivial.

Parallel data mining is the exploitation of fine grained parallelism in data mining, using tightly-coupled processors connected by a high-bandwidth interconnection network.

Implicit in this is the assumption that all the data used in mining is locally available, not globally distributed. This is often the case when commercial or scientific data is collected at one location, and often analyzed at the same location. If the size of the data is very large or a fast turnaround is required, it may be appropriate to mine the data using a parallel system. With 2–16 processor, Intel-based systems becoming inexpensive and common-place, the compute power necessary to implement this fine-grained parallelism is readily available.

Local data can be mined using either tightly-or loosely-coupled processors. In both cases, we need to focus on minimizing the communication costs across the processors. However, for loosely-coupled processors, this communication cost is typically much larger and may suggest the use of distributed data mining techniques, where the data is globally distributed, and communication done via the internet.

Data mining is an interactive and iterative process involving data pre-processing, search for patterns, knowledge evaluation, and possible refinement of the process based on input from domain experts or feedback from one of the steps. The pre-processing of the data is a time-consuming, but critical, first step in the data mining process. It is often domain and application dependent; however, several techniques developed in the context of one application or domain can be applied to other applications and domains as well. The pattern recognition step is usually independent of the domain or application.

Large-scale scientific data mining is a field very much in its infancy, making it a source of research and development. In order to extend data mining techniques to large-scale data, several barriers should be overcome. The extraction of key features from large, multi-dimensional, complex data is an issue that should be addressed first, prior to the application of the pattern recognition algorithms. The features extracted should be relevant to the problem, insensitive to small changes in the data, and invariant to scaling, rotation, and translation. In addition, there is a need to select discriminating features through appropriate dimension reduction techniques. The pattern recognition step poses several challenges as well. For example, is it possible to modify existing algorithms, or design new ones, that are scalable, robust, accurate, and interpretable? Further, can these algorithms be applied effectively and efficiently to complex, multi-dimensional data? And, is it possible to implement these algorithms efficiently on large-scale multiprocessor systems so that a scientist can interactively explore and analyze the data?

While these problems should be overcome for large-scale data mining to be applied in any domain, certain additional concerns should be addressed for scientific data. For example, data from science applications are often available as images, a format that is known to pose serious challenges in the extraction of features. Further, problems in knowledge discovery may be such that the class of interest occurs with low probability, making random sampling inapplicable and traditional clustering techniques ineffective. In many cases, there may be a scarcity of labeled data in a classification problem and several iterations of the data mining process may be required to obtain a reasonable sized training set.

Some applications, such as remote sensing, may need data fusion techniques to mine the data collected by several different sensors, at different resolutions. Another key feature in which data mining applied to science applications differs from its commercial counterpart is that high accuracy and precision are required in prediction and description in order to test or refute competing theories. These problems, specific to scientific data sets, preclude the direct application of software and techniques that have been developed for commercial applications.

Use of the present invention can be better understood through a description of a specific example of a system used for an astronomy dataset. The system was tested by searching for bent-double galaxies in the FIRST survey. The Faint Images of the Radio Sky at Twenty-centimeters (FIRST) is an astronomical survey at radio frequency. The data from this survey is in the form of large image files. The survey, when complete, will have ~50,000 files, each 1150 by 1550 pixels. Each file is mostly noise, with a few radio-emitting galaxies. Applicants' goal was to use the data mining process to find radio-emitting galaxies with a bent-double morphology (or bent-doubles) in the FIRST data.

Applicants first worked with image files that were known to have known (or labeled) examples of bent-doubles and non-bent-doubles. This labeling was done by astronomers manually. This example can be better understood by reference to the steps in the flowchart of FIG. 4. The steps of the flowchart are identified by the numerals in parenthesis. These image files were read (92) and the noise removed from the images (98). The galaxies in the images were then identified i.e. separated from the rest of the image (102) and the features representing each galaxy were obtained (104). These features for each galaxy were stored in the database (112). Any modifications or additions made to these features were also stored in the same database. Features, such as the position of the galaxy in the sky, that were considered not useful for identifying the galaxy as a bent double, were ignored in the rest of the process (107).

Next, applicants separated the set of known or labeled bent-doubles and non-bent-doubles, into a "training set" and a "validation set". Using the features Applicants extracted for the training set, a decision tree was created to identify (108) bents and non-bents. This is the recognition of a "pattern" (in this case, a bent-double) using a classification algorithm (in this case, a decision tree). Once the tree was created, its accuracy was checked against the validation set by checking to see if the tree labeled the galaxies in this set correctly. The first few times of this process, the accuracy was not good enough as many galaxies were mis-labeled. So, Applicants went back and extracted additional features for the galaxies, appending these new features to those already stored in the database (112). Once the accuracy was good enough (as defined by the astronomers), Applicants went back to the original images, identified the galaxies in these images, extracted the corresponding features, and used the tree to identify the label (bent-double or non-bent-double) for these galaxies. These results were shown to the astronomers (110) and when they agreed with the label generated by the decision tree, the Applicants included that galaxy in the training set to enhance the training set. The entire process was then repeated several times till the accuracy of detection of bent-doubles was found satisfactory by the astronomers.

The present invention has other uses in mining scientific data. Other examples of use of data mining for science data include the following:

Astronomy:

separating stars from galaxies (similar to the identification of bents and non-bents)

clustering galaxies according to their shape (uses a similar approach, but with clustering algorithms instead of classification algorithms)

detecting volcanoes on Venus.

Biology:

human genome analyzing mammograms to detect cancerous tumors (similar to bent/non-bent galaxy approach)

analyzing MRI/PET/SPECT data to identify growth/shrinkage of tumor (this would require data fusion, a key step in which is image registration. So, you would "register" the before and after images to see the changes in the tumor.)

Chemistry:

analyzing the data from the results of combinatorial chemistry experiments to identify any patterns in the data.

Remote sensing:

identifying land use exploration for minerals, oil etc.

The present invention also has use in mining business data. Examples of use of data mining for business data include the following:

detecting credit card fraud market-basket analysis: identifying what items people buy together customer retention: identifying which customer is likely to leave a service (e.g., change telephone providers).

The present invention has use in mining engineering data. Examples of use of data mining for engineering data include:

network intrusion detection identifying damage in structures such as bridges, airplanes, or buildings identifying coherent structures in turbulent flow optimization of engineering design The present invention has use in other areas. Examples of use of data mining for "other" data include:

fingerprint recognition face/retinal identification computer vision military applications Applicant's approach to scaling data mining and pattern recognition algorithms to large, complex, multi-dimensional data addresses each of the steps in the data mining process. Applicant's research focus includes: Image processing techniques, including wavelets, feature extraction, dimension reduction techniques to handle multi-dimensional data, scalable algorithms for classification and clustering, parallel implementations for interactive exploration of data, and applied statistics to ensure that the conclusions drawn from the data are statistically sound. Applicant's have designed and implemented a flexible object-oriented software infrastructure to implement the algorithms. This will enable scientists in a variety of disciplines to experiment with various algorithms, fine-tune an algorithm to a problem, and handle growing data sets.

Applicant's work on data mining and pattern recognition algorithms can be applied to many domains. As an initial test-bed application, Applicants have selected the data from the FIRST project. Working with the scientists from the FIRST project, Applicants developed algorithms to automatically detect radio-emitting galaxies with a bent-double morphology. Applicants research in this domain is addressing the important question of feature extraction from complex image data, and accurate algorithms for pattern recognition.

An embodiment of the present invention has been successfully tested in the field of astrophysics where vast quantities of data are gathered during surveys of the sky. An embodiment of the present invention was tested in examining data from the Faint Images of the Radio Sky at Twenty Centimeters (FIRST) sky survey. This test survey, which was conducted at the Very Large Array in New Mexico, seeks to locate a special type of quasar (radio-emitting stellar object) called bent doubles. The FIRST survey has generated more than 32,000 images of the sky to date. Each image is 7.1 megabytes, yielding more than 100 gigabytes of image data in the entire data set. Searching for bent doubles in this mountain of images is as daunting as searching for the needle in the proverbial haystack. The first step in applying data mining to this astrophysical search was to identify what features are unique to radio-emitting bent doubles. In this embodiment, extracting the key features before applying pattern recognition software was found to be important. Although data exist at the pixel level (or at the grid level in mesh data), patterns usually appear at higher or coarser levels. The features which can be any measurement-must be relevant to the problem, insensitive to small changes in the data, and invariant to scaling, rotation, and translation. Identifying the best features can be a time-intensive step, but it's a very important one. Applicants worked with astrophysicists to draw up a list of features useful in identifying bent doubles. Such features included the number of "blobs," the spatial relationships of the blobs, and the peak intensity of the radio waves detected from each blob. A parallel concern was to reduce the number of features to a relatively small set that will still provide accurate results. Every additional feature used in pattern recognition on a terabyte data set adds enormously to the computational time and effort.

Another embodiment of the present invention is visualized for use in "The MACHO Project," which is a collaboration between scientists at the Mt. Stromlo & Siding Spring Observatories, the Center for Particle Astrophysics at the Santa Barbara, San Diego, & Berkeley campuses of the University of California, and the Lawrence Livermore National Laboratory. Applicants' primary aim was to test the hypothesis that a significant fraction of the dark matter in the halo of the Milky Way is made up of objects like brown dwarfs or planets: these objects have come to be known as MACHOs, for MAssive Compact Halo Objects. The signature of these objects is the occasional amplification of the light from extragalactic stars by the gravitational lens effect. The amplification can be large, but events are extremely rare: it is necessary to monitor photometrically several million stars for a period of years in order to obtain a useful detection rate. An example would be use of a two channel system that employs eight 2048*2048 CCDs, mounted on the 50 inch telescope at Mt. Stromlo. The high data rate (several GBytes per night) is accommodated by custom electronics and on-line data reduction. The data mining system of the present invention would be ideal for the analysis of these large and complex datasets.

An embodiment of the present invention can be used for detecting credit card fraud. In credit card fraud an important feature is the location where a card is used. Thus, if a credit card is suddenly used in a country where it's never been used before, fraudulent use is likely. By applying and extending concepts from data mining and pattern recognition and addressing the challenges that arise when data mining techniques are applied to massive and complex data sets, the embodiment of the present invention can be used for detecting credit card fraud. Other embodiments of the present invention can be used for areas such as nuclear weapons stockpile stewardship, where computer simulations have replaced experiments, and climate modeling, where experiments are impractical or unwise.

Referring now to FIG. 1, an embodiment of the present invention is illustrated. Data mining starts with the raw data and includes extensive pre-processing as illustrated in FIG. 1. If the raw data is very large, the embodiment of the present invention may use sampling and work with fewer instances, or use multiresolution techniques and work with data at a coarser resolution. This first step may also include data fusion, if required. Next, noise is removed, objects are identified, and relevant features for each object are extracted from the data. At the end of this step, the embodiment of the present invention has created a feature vector for each data instance. Depending on the problem and the data, the embodiment of the present invention may need to reduce the number of features using dimension reduction techniques such as principal component analysis (PCA) or its non-linear versions. After this pre-processing, the data is ready for the detection of patterns. These patterns are then displayed to the user, who validates them appropriately.

As shown in FIG. 1, the data mining process is iterative and interactive; any step may lead to a refinement of the previous steps. User feedback plays a critical role in the success of data mining in all stages, starting from the initial description of the data, the identification of potentially relevant features and the training set (where necessary), and the validation of the results.

The development of the embodiment of the present invention required consideration of the design of the system. In order to implement the data mining process in a parallel setting as illustrated in FIG. 1, some considerable thought was given to the system's design. Applicants' experience has shown that a good design should take into account the following: (1) Not all problems require the entire data mining process, so each of the steps should be modular and capable of stand-alone operation. (2) Not all algorithms are suitable for a problem, so the software should include several algorithms for each task, and allow easy plug and play of these algorithms. (3) Each algorithm typically depends on several parameters, so the software should allow user friendly access to these parameters. (4) Intermediate data should be stored appropriately to support refinement of the data mining process. (5) The domain dependent and independent parts should be clearly identified to allow maximum re-use of software as we move from one application to another.

Figure 2:
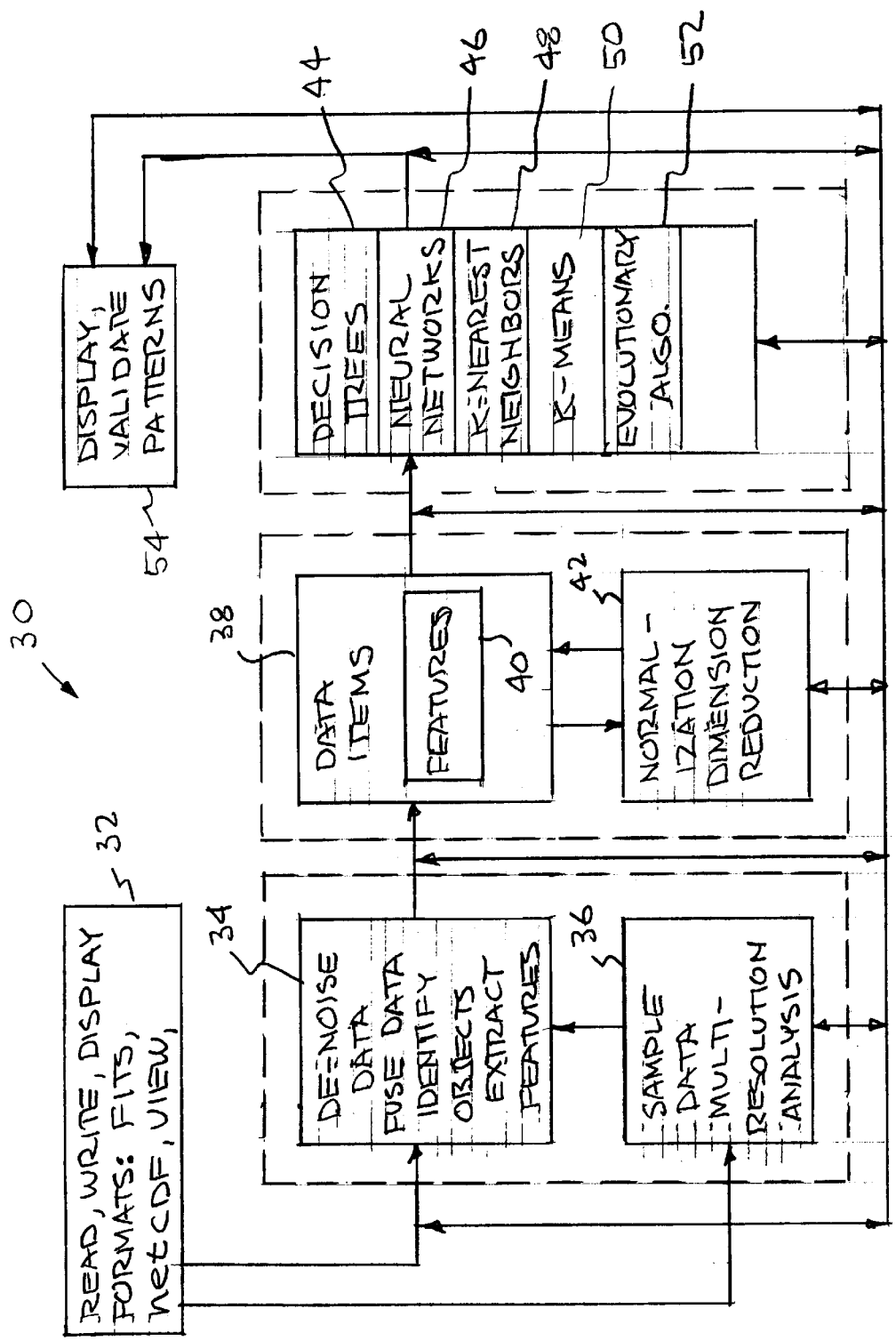
FIG. 2 is an illustration of an embodiment of the present invention demonstrating the systems flexible and extensible architecture.

To accommodate these requirements, Applicants developed the system architecture shown in FIG. 2. The focus of system is on the compute-intensive tasks as these benefit the most from parallelism. Such tasks include decision trees, neural networks, image processing, and dimension reduction. Each class of algorithms is designed using object-oriented principles and implemented as a C++ class library. Parallelism is supported through the use of MPI and OpenMP for distributed and shared-memory parallel processing, respectively. Applicants used domain-specific software for tasks such as reading, writing, and display of data. To support many different input data formats, such as FITS, View, and netCDF, Applicants first convert each format into the system's internal data format, prior to any processing. Applicants used RDB, a public-domain relational data base, as the permanent data store to store the intermediate data generated at each step. This has turned out to be invaluable as it has allowed Applicants to experiment with different subsets of features and enabled Applicants to easily support a growing data set. The eventual goal is that once each of the class libraries is implemented, Applicants will be able to provide a solution to a problem in a domain by simply linking the appropriate algorithms using a scripting language such as Python. Applicants can use other databases as well.

Two factors, unique to data mining, made it challenging to incorporate parallelism in the architecture: (1) As data mining proceeds from feature extraction to the discovery of useful information, the data processed reduces in size. This reduction can be very drastic, e.g., from a Terabyte to a Megabyte. Further, some of the data pre-processing could occur on the parallel machine where the data is being generated, while the rest of the data analysis could take place on a different parallel machine with possibly fewer processors. Ensuring the end-to-end scalability of the data mining process under these circumstances could prove very challenging. (2) The very nature of data mining requires close collaboration with the domain scientists at each step. Incorporating this iterative and interactive aspect into a parallel framework is a non-trivial task.

Applicants' next focus was on the algorithms in data mining, namely, decision trees, and on denoising. Applicant's also developed an approach to the design and implementation of parallel software and to show how the need to support flexibility in a parallel implementation can give rise to conflicting requirements.

Parallel Decision Tree Software—Decision trees belong to the category of classification algorithms wherein the algorithm learns a function that maps a data item into one of several pre-defined classes. These algorithms typically have two phases. In the training phase, the algorithm is "trained" by presenting it with a set of examples with known classification. In the validation phase, the model created in the training phase is tested to determine how well it classifies known examples. If the results meet expected accuracy, the model is put into operation to classify examples with unknown classification. This operation is embarrassingly parallel as several "copies" of the classifier can operate on different examples. It is important for the training phase of the classifier to be efficient as Applicants need to find an optimum set of parameters which will enable accurate and efficient results during the operation of the classifier.

A decision tree is a structure that is either a leaf, indicating a class, or a decision node that specifies some test to be carried out on a feature (or a combination of features), with a branch and sub-tree for each possible outcome of the test. The decision at each node of the tree is made to reveal the structure in the data. Decision trees tend to be relatively simple to implement, yield results that can be interpreted, and have built-in dimension reduction. Parallel implementations of decision trees have been the subject of extensive research in the last few years An approach used to construct a scalable decision tree was first described in the SPRINT algorithm. Instead of sorting the features at each node of the tree as was done in earlier implementations, it uses a single sort on all the features at the beginning. The creation of the tree is thus split into two parts:

(1) Initial Sorting

First the training set is split into separate feature lists for each feature. Each list contains the identification (ID) number of the data instance, the feature value, and the class associated with the instance. This data is partitioned uniformly among the processors.

Next, a parallel sort is performed on each feature list which results in each processor containing a static, contiguous, sorted portion of the feature. As a result of this sort, the data instances for one feature in one processor may be different from the data instances for another feature in the same processor. Since all the features corresponding to one data instance may not belong to the same processor, it is important to include the ID number of the data instance in the feature list.

Next, Applicants build count statistics for each of the features in each processor.

(2) Creation of the Decision Tree

Find the optimal split point.

Each processor evaluates each of the local feature lists to find the best local split (this is done in parallel by all processors).

It communicates the local best splits and count statistics to all processors.

Each processor determines the best global split (this is done in parallel by all processors).

Split the Data. Each processor splits on the winning feature, and sends the ID numbers of its new left and right node data instances to all other processors.

Then, each processor builds a hash table containing all the ID numbers, and information on which instances belong to which decision tree node.

Next, each processor, for each feature, probes the hash table for each ID number to determine how to split that feature value.

This process is carried out on the next unsolved decision tree.

An improved version of the SPRINT algorithm that is scalable in both run-time and memory requirements is described in ScalParC. This differs from SPRINT in two ways. First, a distributed hash table is used, instead of a single hash table which is replicated in each processor. This reduces memory requirements per processor, making the algorithm scalable with respect to memory. Second, as in SPRINT, the decision tree nodes are constructed breadth-first rather than depth-first and processor synchronization is held off until all work is done for that level of the tree. This not only limits the communication necessary for synchronization, but also results in better load balancing since processors that finish with one node of the tree can move directly on to the next node.

Applicants' goal in the design and implementation of the systems decision tree software is to take the ScalParC approach and extend it to include the following:

1) Support for several different splitting criteria: The feature to test at each node of the tree, as well as the value against which to test it, can be determined using one of several measures. Depending on whether the measure evaluates the goodness or badness of a split, it can be either maximized or minimized. Let T be the set of n examples at a node that belong to one of k classes, and $T_L$ and $T_R$ be the two non-overlapping subsets that result from the split (that is, the left and right subsets). Let $L_j$ and $R_j$ be the number of instances of class j on the left and the right, respectively. Then, the split criteria Applicants want to support include:

Gini: This criterion is based on finding the split that most reduces the node impurity, where the impurity is defined as follows:

$$L_{Gini} = 1.0 - \sum_{i=1}^{k} (L_i/|T_L|)^2, \quad R_{Gini} = 1.0 - \sum_{i=1}^{k} (R_i/|T_R|)^2$$

$$\text{Impurity} = (|T_L|*L_{Gini} + |T_R|*R_{Gini})/n$$

where $|T_L|$ and $|T_R|$ are the number of examples, and $L_{Gini}$ and $R_{Gini}$ are the Gini indices on the left and right side of the split, respectively. This criterion can have problems when there are a large number of classes.

Twoing rule: In this case, a "goodness" measure is evaluated as follows:

$$\text{Twoing value} = (|T_L|/n) * (|T_R|/n) * (\sum_{i=1}^{k} |L_i/|T_L| - R_i/|T_R||)^2$$

Information Gain: The information gain associated with a feature is the expected reduction in entropy caused by partitioning the examples according to the feature. Here the entropy characterizes the (im)purity of an arbitrary collection of examples. For example, the entropy prior to the split in our example would be:

$$\text{Entropy}(T) = \sum_{i=1}^{k} -p_i \log_2 p_i, \; p_i = (L_i + R_i)/n$$

where $p_i$ is the proportion of T belonging to class i and $(L_i + R_i)$ is the number of examples in class i in T. The information gain of a split S relative to T is then given by $$\text{Gain}(T, S) = \text{Entropy}(T) - \frac{|T_L|}{|T|} \text{Entropy}(T_L) - \frac{|T_R|}{|T|} \text{Entropy}(T_R)$$

where $T_L$ and $T_R$ is the subset of S corresponding to the left and right branches respectively. This criterion tends to favor features with many values over those with few values.

Information Gain Ratio: To overcome the bias in the information gain measure, Quinlan suggested the use of information gain ratio which penalizes features by incorporating a term, called the split information, that is sensitive to how broadly and uniformly the feature splits the data.

$$\text{Split Information } (T) = -(|T_L|/n)\log_2(|T_L|/n) - (|T_R|/n)\log_2(|T_R|/n)$$

where $T_L$ and $T_R$ are the subsets resulting from partitioning T. Note that the split information is the entropy of T with respect to the split S. The Gain ratio is then defined as Gain Ratio(T)=Gain(T)/Split Information(T)

Max Minority: This criterion is defined as $$L_{minority} = \sum_{i=1, i \neq maxLi}^{k} L_i, \; R_{minority} = \sum_{i=1, i \neq maxRi}^{k} R_i$$

Max minority=max $(L_{minority}, R_{minority})$

This has the theoretical advantage that a tree built by minimizing this measure will have depth at most log n. This is not a significant advantage in practice and trees created by other measures are seldom deeper than the ones produced by Max Minority.

Sum Minority: This criterion minimizes the sum of $L_{minority}$ and $R_{minority}$, which is just the number of misclassified instances.

2) Support for non-axis-parallel decision trees.

Traditional decision trees consider a single feature at each node, resulting in hyperplanes that are parallel to one of the axes. While such trees are easy to interpret, they may be complicated and inaccurate in the case where the data is best partitioned by an oblique hyperplane. In such instances, it may be appropriate to make a decision based on a linear combination of features, instead of a single feature. However, these oblique trees can be harder to interpret. They can also be more compute intensive as the problem of finding an oblique hyperplane is much harder than the problem of finding an axis-parallel one. None-the-less, Applicants early research has shown that when used in conjunction with evolutionary algorithms, these oblique classifiers could prove competitive in some cases. To further explore these ideas, Applicants are designing software such that, in addition to axis parallel trees, it can support the following types of splits at each node:

CART-LC: Breiman et. al, suggested the use of linear combinations of features to split the data at a node. If the features for a data instance are given as $(x_1, X_2, \ldots, x_n, c)$, where c is the class label associated with the instance, then, Applicants search for a best split of the form $$\sum_{i=1}^{n} a_i x_i \leq d \text{ where } \sum_{i=1}^{n} a_i^2 = 1$$

and d ranges over all possible values. The solution approach cycles through the variables $x_1, \ldots, x_n$, trying to find the best split on each variable, while keeping the others constant. A backward deletion process is then used to remove variables that contribute little to the effectiveness of the split. This approach is fully deterministic and can get trapped in a local minima.

OC1: The oblique classifier OC1 attempts to address some of the limitations of the CART-LC approach by including randomization in the algorithm that finds the best hyperplane. Further, multiple random re-starts are used to escape local minima. In order to be at least as powerful as the axis-parallel decision trees, OC1 first finds the best axis-parallel split at a node before looking for an oblique split. The axis-parallel split is used if it is better than the best oblique split determined by the algorithm for that node.

OC1 shifts to an axis-parallel split when the number of examples at a node falls below a user-specified threshold to ensure that the data does not underfit the concept to be learned.

Oblique-EA: In this approach, Applicants use evolutionary algorithms to find the best hyperplane represented by the coefficients $(a_1, \ldots, a_n, d)$. An individual in the population is represented by the concatenated version of these coefficients. The fitness of each individual is determined by evaluating how well it splits the examples at a node for a given split criterion. Evolutionary algorithms thus allow us to work with all the coefficients at a time instead of the series of univariate splits considered in OC1 and CART-LC.

Applicants have explored two options for evolutionary algorithms. In one case Applicants use a (1+1) evolutionary strategy with adaptive mutations. The initial hyperplane is the best axis-parallel split for the node. For each hyperplane coefficient, Applicants have a mutation coefficient, which is updated at each iteration and used to determine the new hyperplane coefficient. Applicants then select the best between the parent and child hyperplanes. In the second approach, Applicants use a simple generational GA with real valued genes. The initial population consists of 10% copies of the axis-parallel hyperplane, and the rest are generated randomly. Applicants initial experiments have shown that in some cases, the Oblique-EA approaches are faster and more accurate than OC1.

3) Support for Both Numeric and Nominal Features.

4) Support for Different Pruning Options and Stopping Criteria. Applicants are interested in exploring different ways to avoid over-fitting through pruning and rules that decide when to stop splitting, such as the cost complexity pruning technique of Breiman or the minimum description length approach suggested by Quinlan and Rivest.

Applicants main challenge is to support these options and include the flexibility to add new options without re-writing the code that supports the parallel implementation of the decision tree.

The Sapphire Decision Tree Design—Applicants are interested in a decision tree design that gives us enough flexibility to experiment with different options within a parallel implementation. It is relatively easy to support some of these options within the context of an object-oriented design. For example, different splitting criteria can be easily supported by having an abstract base class from which concrete classes for the split criterion are inherited. These concrete classes implement the function used to determine the quality of a split. The user can then instantiate an object in one of these classes to indicate the split criterion used at all nodes of the tree. This choice would be communicated to the decision tree object by passing a pointer to the base split criteria class as an argument. A similar situation holds in the case of pruning options which are executed after the tree is built. In both cases, the main operation performed by the class is at a low-enough level that no parallelism is required in the implementation of the operation.

The prefix di_is used to indicate classes that contain domain information, tbox_to indicate toolbox classes for general use, and dt_to indicate classes used in the decision tree. Note that the di_classes can be used in other classification and clustering algorithms, not just decision trees. A brief description of the classes is as follows:

di_FeatureValue: This contains either a nominal (discrete) feature or a numeric (continuous) feature, but never both at the same time.

di_InstanceInfo: This contains the number of features, the name of the features and their type for a data instance.

di_Instance: This contains the features for a data instance. It is typically used in conjunction with di_InstanceInfo.

di_InstanceArray: This can be used for the training set, where each data instance has several features or even for the feature lists that contain only a single feature and are created in the first part of the parallel decision tree.

tbox_NominalHistogram: This creates a histogram for nominal data.

dt_SplitCriterion: This abstract base class represents the criterion to be used to evaluate the split at each node. The derived classes denote the value that is returned after an evaluation of a split. As Applicants find new ways of judging a split, a new class can be derived from the base class to implement that split criterion. The same split criterion is used in the entire decision tree.

dt_SplitFinder: This base class represents the approach used to find the split—whether axis-parallel, oblique, CART-LC etc. Derived classes implement the actual determination of the split. The SplitFinder used at any node of the tree may vary depending on several factors. For example, if the instances at a node are few, an axis parallel approach may be chosen instead of an oblique one. Or, evaluation of an oblique split may indicate that an axis-parallel split is a better choice for the data at a node. Regardless of the choice of SplitFinder, the user can independently select the split criterion used to evaluate the split. It is possible to exploit parallelism within the SplitFinder class.

dt_TreeNode: This class contains the information on a node of the tree. It includes pointers to the Instance-Arrays stored using a single feature at a time, the left- and right-hand sides of the split made at the node, the type of SplitFinder, the count statistics for each feature, and pointers to the children nodes created by the split. Once the split is determined using the SplitFinder, the TreeNode object is responsible for actually splitting the instances among the children node. Parallelism can be exploited within this class.

dt_DecisionTree: This is the main class that creates, tests, and applies the tree. It can also print out the tree, save it to a file, and read it back from a file. Starting with a root TreeNode that contains the entire training set, it creates the child nodes by choosing the appropriate SplitFinder, using the SplitCriterion set by the user. The single sort that is required by the parallel implementation is done at the beginning of the training of the decision tree. Parallelism is exploited within this class.

One of the challenges Applicants face in supporting several different options in parallel decision tree software is that the approach taken for efficient implementation of one option could directly conflict with the efficient implementation of another option. An interesting case of this arises in the SplitFinder class. The ScalFarC approach, which generates axis-parallel trees, sorts each feature at the beginning of the creation of the tree. As mentioned earlier, this results in the features that comprise a single data instance to be spread across more than one processor. However, for oblique classifiers, in order to evaluate a split, all features in a data instance are needed. If these features are spread across processors, communication would be required. This communication could very likely have an irregular pattern and, depending on how the features corresponding to a data instance are spread our among the processors, could be extensive. This would suggest that to support oblique splits, Applicants should not sort each of the features prior to the creation of the decision tree. However, regardless of the technique used to calculate an oblique split, Applicants still need to evaluate axis-parallel splits. For example, an oblique split starts with an axis parallel split, is compared with an axis parallel split in order to select the better of the two, and determines an axis-parallel split for each coefficient at a time, keeping the others constant.

This gives rise to an interesting dilemma—should Applicants sort each feature at the beginning or not? It is always possible to have two sets of features, one sorted and the other unsorted, even though it would almost double the memory requirements. The other option is to work with only one set of features, but should Applicants picked the sorted or the un-sorted one? Since sorting would result in extensive communication in the case of oblique splits, a possible solution approach would be to see if Applicants could somehow mimic the axis-parallel split efficiently on un-sorted data.

To determine the best axis parallel split, Applicants first sort the values for a feature, and then determine the value of a split if the split point was taken mid-way between two consecutive feature values. The best split across all features is chosen as the best split at a node. Instead of this approach, suppose Applicants generate a histogram for each of the features, Applicants can select as a split value the boundary value of each bin in the histogram. If the histogram kept track of the count statistics for each class in a bin, Applicants could use this information to select the best split based on any splitting criterion. If the bin widths are chosen appropriately, this could give a good approximation to the axis-parallel split.

A different issue Applicants need to address in the parallelization of decision trees is the implementation on clusters of SMPs, where Applicants may need to use both distributed and shared memory programming. This could be most beneficial in the case where Applicants use genetic algorithms to search for the best oblique hyperplane, as genetic algorithms tend to be expensive to implement. This would give rise to some interesting solution approaches. Suppose the data instances with unsorted features are distributed uniformly across the nodes of a parallel system. Then the SMP processors within each node could work on finding the best oblique hyperplane for its set of data instances, while occasionally exchanging members with other nodes in order to find a hyperplane that best splits the entire set of data instances.

Parallel Object-oriented Image Processing Toolkit

For image data, extensive pre-processing is often required before the detection of patterns in the data. This preprocessing can frequently take up to 90% of the total time for data mining in moderate-sized data sets. To help make this task more efficient, the Applicants have designed and tested an object-oriented image processing system that specifically targets massively-parallel, distributed-memory architectures. Applicants have been able to show that it is possible to use object-oriented technology to effectively address the diverse needs of image applications. In addition, Applicants have been able to show how similarities in image processing algorithms can be used to enable re-use in Applicants software. Applicants have also been able to show how the difficulties encountered in parallelizing image algorithms on massively parallel machines, as well as the bottlenecks to high performance, can be addressed. Applicants have demonstrated the system using images from an astronomical data set, and have illustrated how techniques such as filters and denoising through the thresholding of wavelet coefficients can be applied when a large image is distributed across several processors. This work is explained using wavelet denoising as an example.

In many fields, where there are massive amounts of data to be analyzed, the very process of collecting the data can introduce noise in the data. The noise can be due to the data acquisition process or due to natural phenomena such as atmospheric disturbances. Removing the noise from the data is an important problem that must be addressed before we can analyze the data. This is especially true of image data, where the noise statistics can vary from domain to domain, and sometimes from image to image, One approach to denoising data involves the thresholding of wavelet coefficients. Most methods in the literature have been designed for one-dimensional signals, but they can be extended to higher dimensional signals as well. As part of the Applicants data mining system, the Applicants have developed a software toolkit to enable easy experimentation with different options in wavelet denoising such as the choice of wavelet transforms, noise estimation techniques, threshold calculation methods, and threshold application schemes. The Applicants goal was three-fold. The first was to create a comprehensive object-oriented software library of wavelet denoising techniques to complement the extensive literature and existing software on the subject. Second, the Applicants wanted to provide scientists, who are not experts in wavelet denoising, with a choice of techniques, so that they could select a combination appropriate for their data. Third, the Applicants wanted to compare and contrast the various options in order to provide guidance and recommendations on their usage.

The Applicants work on wavelet denoising is part of a larger image processing system. The compute intensive nature of these image-processing techniques, especially when the data set is very large, makes these tasks ideal for parallel processing. If the data set consists of a large number of small to moderate size images, an understood use of parallel processors would be to assign one or more images to each processor. However, if each image is itself very large, an individual may want to use parallel processing within an image. To do this efficiently can be very challenging.

Image processing techniques that are commonly used in mining image data include image registration, enhancement, denoising, segmentation, edge detection, feature extraction and multi-resolution analysis. The Applicants illustrate an approach to object-oriented parallel implementation using wavelets and wavelet denoising as an example. These are appropriate operations to consider as they are composed of other operations that occur in several image processing tasks. For example, the Applicants consider wavelets in terms of filters banks composed of high- and low-pass filters. Efficient implementation of filters in the context of wavelets can help several other operations such as edge detection and smoothing. In addition, certain ideas developed in the context of filters can also be applied in other areas such as morphological image processing. These common aspects across operations can be exploited through the use of object-oriented techniques.

In the last decade, there has been an increasing interest in using object-oriented paradigms for the development of software in scientific applications. This approach is attractive as it supports well-defined mechanisms for a modular design, re-use of code, data abstractions, and the creation of flexible software that can easily be enhanced to support new applications as well as solution techniques. While object-oriented applications may initially be more abstract, difficult to understand and implement, and possibly slower, they do provide the means of addressing complex problems through step-wise software development. For example, many techniques in image processing can be expressed as operations among local collections of pixels (or geometric regions). Linear filters and discrete wavelet operators, where a linear transformation is applied to neighboring pixels in the specified region, are examples of such techniques. Other examples where the transformation depends on the local data are non-linear filters and morphological operators. Object-oriented techniques can help to abstract out the commonalties in such image processing operations. The resulting software re-use enables the Applicants to easily enhance the functionality of the software. Another example is the parallel implementation of the Applicants algorithms. Applicants can identify and isolate the parallel processing tasks that are common across several operations.

Applicants image processing toolkit is targeted toward Massively Parallel Processors (MPPs) or clusters of Symmetric Multi-Processors (SMPs). On these architectures, communication between processors is done through the use of the Message Passing Interface (MPI) and the OpenMP libraries. Several important issues have to be considered in order to design and implement an efficient parallel image processing toolkit. Many of these can be characterized as cost related. Minimizing the cost of communication is critical to parallel performance and scalability of any software. In the MPI programming paradigm, data is communicated between processors as conceptual "sends" and "receives."

The implementation of this send/receive mechanism is architecture dependent; but, as a rule, it is more expensive to carry out communication of arithmetic data than computation with the same data. Another important issue is to minimize the time spent in first developing, and later, debugging, parallel algorithms. In light of these issues, Applicants design approach seeks to:

Perform the communication efficiently in order to minimize its effect.

Reduce the development and maintenance time through the re-use of common communication-related elements.

To achieve these goals and incorporate flexibility into Applicants software, it is desirable that the image processing operations be independent of the data distribution and communication paradigms. In other words, Applicants want Applicants algorithms to work regardless of how the user has configured the processors. To accomplish this, Applicants have incorporated the following into Applicants design methodology:

Development of data partitions and processor configurations

Determination of the communication requirements based on the partition

Efficient agglomeration of the work

Mapping the work to the processors

Performing the actual work

For the local operations mentioned earlier, many of the ideas for effectively implementing the above methodology have been studied extensively. In particular, Applicants can benefit from the work done in the fields of parallel numerical techniques for Linear Algebra and the solution of Partial Differential Equations. Applicants exploit the fact that in general, the local operations have the following characteristics:

Local—each task communicates with a small set of other tasks

Structured—a task and its neighbors form a regular structure

Static—the identity of communication partners does not change over time

Synchronous—producers and consumers execute in a coordinated fashion, with producer/consumer pairs cooperating in data transfer operations An effective way to address such problems is to first partition the image into contiguous rectilinear collections of pixels called boxes, and then to configure the processors to the resulting rectilinear partitioning. A box specifies the lower and upper indices that denote the corners of a sub-image. Set or algebraic operations can be performed on boxes, such as:

Grow/shrink—increase (or decrease) the size of a box in various ways,

Refine/coarsen—refine (or coarsen) the index space associated with the box, and

Intersect/union—perform set manipulations with the index spaces.

This box concept, along with the conventions adopted in MPI, enables the Applicants to address, directly or indirectly, the design methodology concepts mentioned earlier. An image processing application first uses MPI to create logically rectangular processor configurations and then maps the data onto the processor configuration in the form of boxes. To address performance concerns, Applicants toolkit includes data distribution algorithms that partition the data and configure the processors so that the surface to volume ratio of the boxes is minimized. For operations based on regular grids, such as images, this minimization of the surface to volume ratio tends to minimize the cost of communication and maximize the performance.

Figure 3:
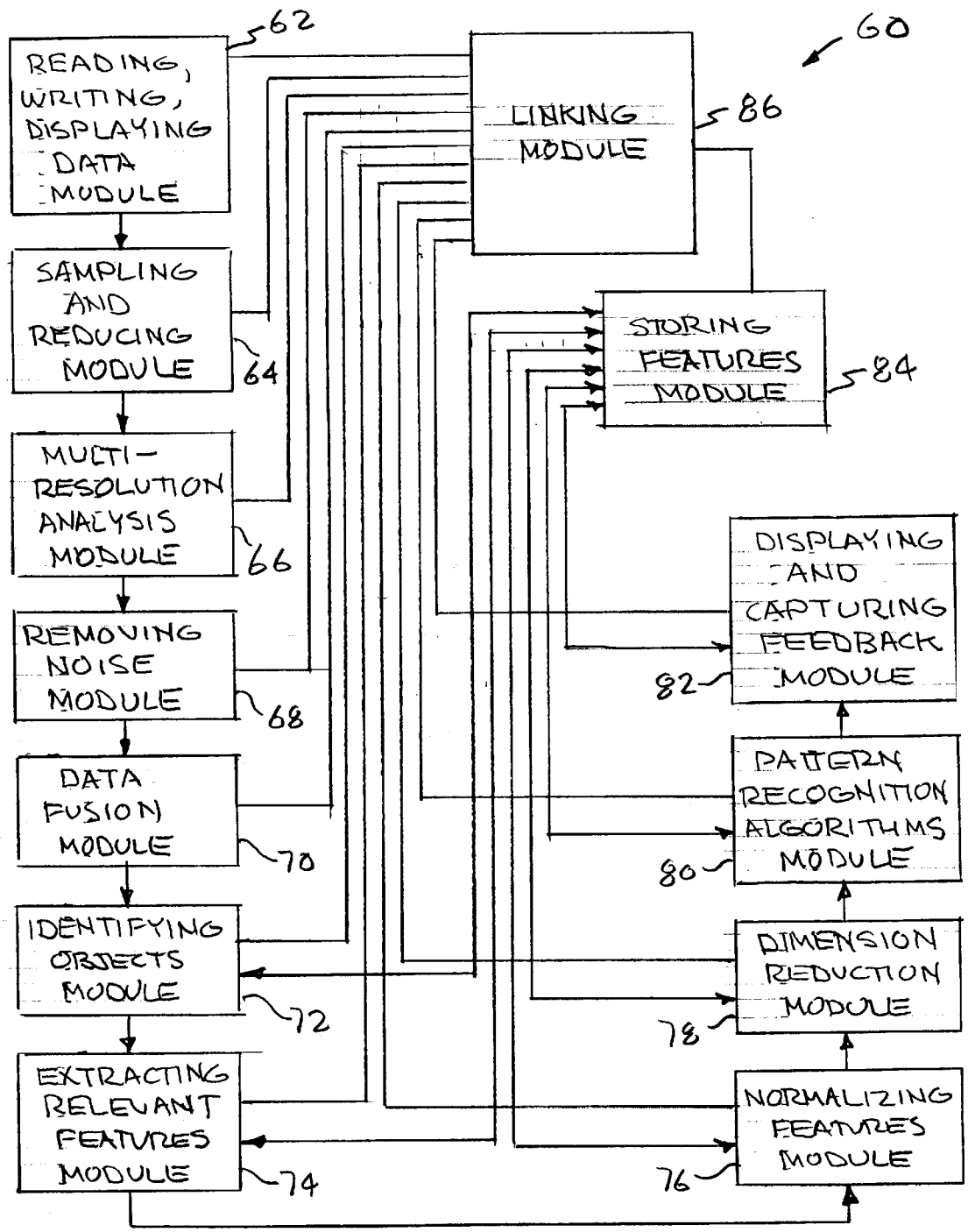
FIG. 3 is a flow chart showing the basic modules that constitute one embodiment of the present invention.

FIG. 3 is a flow chart 60 showing the basic modules that constitute one embodiment of the present invention. The individual modules of the flowchart 60 shown in FIG. 3 include the following (It is to be understood that not all of the modules are used in individual embodiments of the invention):

parallel object-oriented module 62 for reading, writing, displaying data files;

parallel object-oriented module 64 for sampling said data files to reduce the number of said data files;

parallel object-oriented module 66 for multi-resolution analysis to perform a reversible transformation into a coarser resolution of said data files;

parallel object-oriented module 68 for removing noise from said data files;

parallel object-oriented module 70 for data fusion of said data files;

parallel object-oriented module 72 for identifying objects in the said data files;

parallel object-oriented module 74 for extracting relevant features for each of said objects;

parallel object oriented module 76 for normalizing said features;

parallel object-oriented module 78 for dimension reduction (reducing the number of said features of said objects);

parallel object-oriented module 80 for pattern recognition algorithms;

parallel object-oriented module 82 for displaying said data files and said objects and capturing feedback from scientists for validation;

storing features module 84 for storing the features for each of said objects, after they have been extracted in module 74, reduced in number in module 76, used for pattern recognition in module 80, and displayed in module 82; and module 86 for linking the parts of the data mining system.

Figure 4:
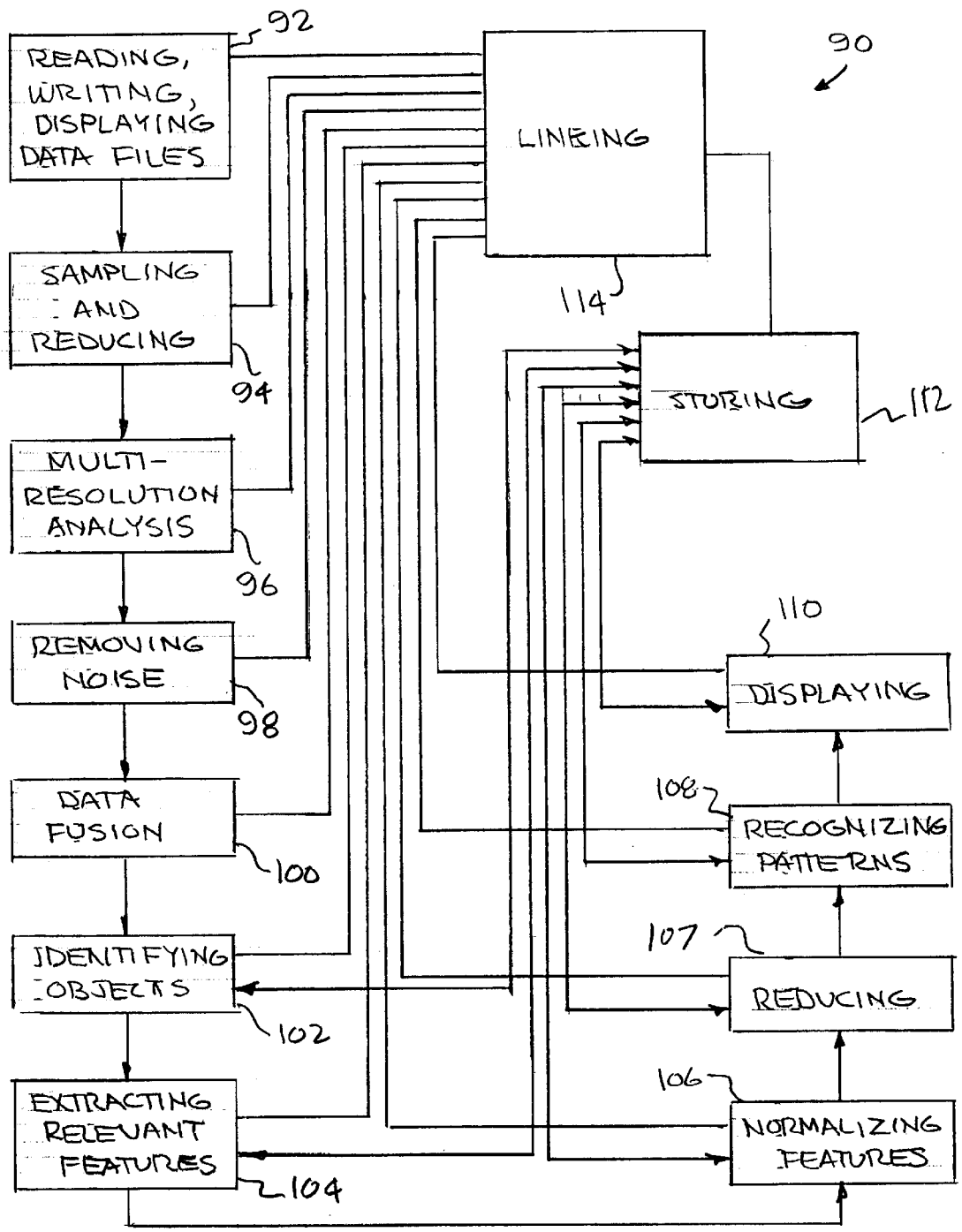
FIG. 4 is a flow chart showing the basic steps of a method that is one embodiment of the present invention.

FIG. 4 is a flow chart 90 showing the basic steps of a method that is one embodiment of the present invention. The steps shown in FIG. 4 include the following:

reading, writing, displaying data files step 92;

sampling said data files and reducing the number of said data files step 94;

multi-resolution analysis to perform a reversible transformation into a coarser resolution of said data files step 96;

removing noise from said data files step 98;

data fusion of said data files step 100;

identifying objects in the said data files step 102;

extracting relevant features for each of said objects step 104;

normalizing the said features of the said objects step 106;

reducing the dimension or number of said features of said objects step 107;

recognizing patterns among said objects using said features step 108;

displaying said data files and said objects and capturing feedback from scientists for validation step 110;

storing the said features for each of said objects, after they have been extracted in step 104, reduced in number in step 107, used for pattern recognition in step 108, and displayed in step 110; and linking the parts of the data mining system step 114.

Examples of embodiments of the present invention have been shown for data mining scientific data. Examples of engineering and business data mining embodiments of the present invention will now be described.

Business Data—Customer relationship management, for example, identifying which customers are likely to leave a service provider, so they can be offered special deals to entice them to stay with the provider. The provider could be providing say telephone or internet service. Consider an example of a telephone service provider. Since a customer is with a service provider, the provider would have information on the customer (the customer profile) including their name, address, credit history, how many hours they use the phone, how many local calls are made, how many long distance calls, how many overseas calls, etc. The provider would also have information on customers who in the past have left the provider and those who have remained with the provider. This would give them a "labeled" set of examples, based on which, they want to predict if an existing customer with a given profile is likely to stay with the service provider or not. Since the labeled set is generated historically, it may be very large (in contrast with science data, where it is generated manually and is therefore relatively small).

The data mining process for this task would proceed according to steps shown in the flowchart of FIG. 4 as follows. First, we would read in the data files for each customer in the labeled set according to step 92. Some "noise" in the data may have to be removed according to step 98—for example, the state in the address may be written as either "Ca," "Ca.," "CA," or "California," and a consistent notation may have to be selected. The identification of the object in the data file is simple as it is just a customer according to step 102. Since the labeled set can be large, sampling may be necessary to reduce the number of objects (i.e. customers) according to step 94. The extraction of features according to step 104 to represent each customer is also relatively simple as it is the information in the customer profile. Some normalization of the features might be necessary according to step 106 for example to account for the fact that an annual salary of say $50,000 might imply different living standards in different parts of the country (determined from the zipcode in the address). Dimension reduction according to step 107 might be needed to determine for example that the fact that a customer owns a pet does not indicate that they are less or more likely to leave a service provider. Next, the labeled set is used to create a decision tree classifier or a neural network classifier according to step 108 that can determine, to within an accuracy deemed sufficient by the service provider, if a customer is likely to leave a service provider. This decision tree or neural network can then be used to determine if a customer currently with the provider is likely to leave and a suitable deal offered to the customer to entice them to stay. Note that the order of the tasks in this example is somewhat different from the astronomy example. Applicants flexible design allows us to easily accommodate such changes.

Engineering Example—Identifying damage in structures such as bridges or airplanes. As airplanes, bridges, and other structures age, the parts that comprise these structures also age or corrode, and are likely to fail, causing failure of the entire structure. To avoid this, these parts must be replaced over time. It is important to identify when a part has corroded and must be replaced. If the part is replaced too soon, it results in wasted resources; if it is not replaced soon enough, it might result in a catastrophe.

One way to identify when to replace a part is through non-destructive evaluation. This process obtains data on the structure through non-destructive means e.g., evaluating the displacements of parts of the structure as it is subjected to various loadings, or taking measurements of the electrical properties of a material. This data can be mined to predict when a material or part is likely to fail.

The data obtained from the non-destructive tests is first read in according to step 92. The identification of the object according to step 102 in this case is simple as it is just the material or components of the structure being tested. The features according to step 104 are typically the values obtained for the various properties being measured. Some normalization of the features according to step 106 might be required for example if the units for one features make it artificially more important than the other features. Then, based on known (or labeled) examples of objects which have failed and not failed, and the corresponding features for these objects, we can create a decision tree or neural network classifier according to step 108 to accurately discriminate the failed objects from the not-failed ones. The classifier can be used to assign a label to the unlabeled set of objects. The results can be shown to the scientists according to step 110, who can then decide if the classifier is working accurately. If not, the process is repeated by extracting additional relevant features. This same approach can be used for identifying contents of containers containing possibly hazardous material.

Figures 5, 6:
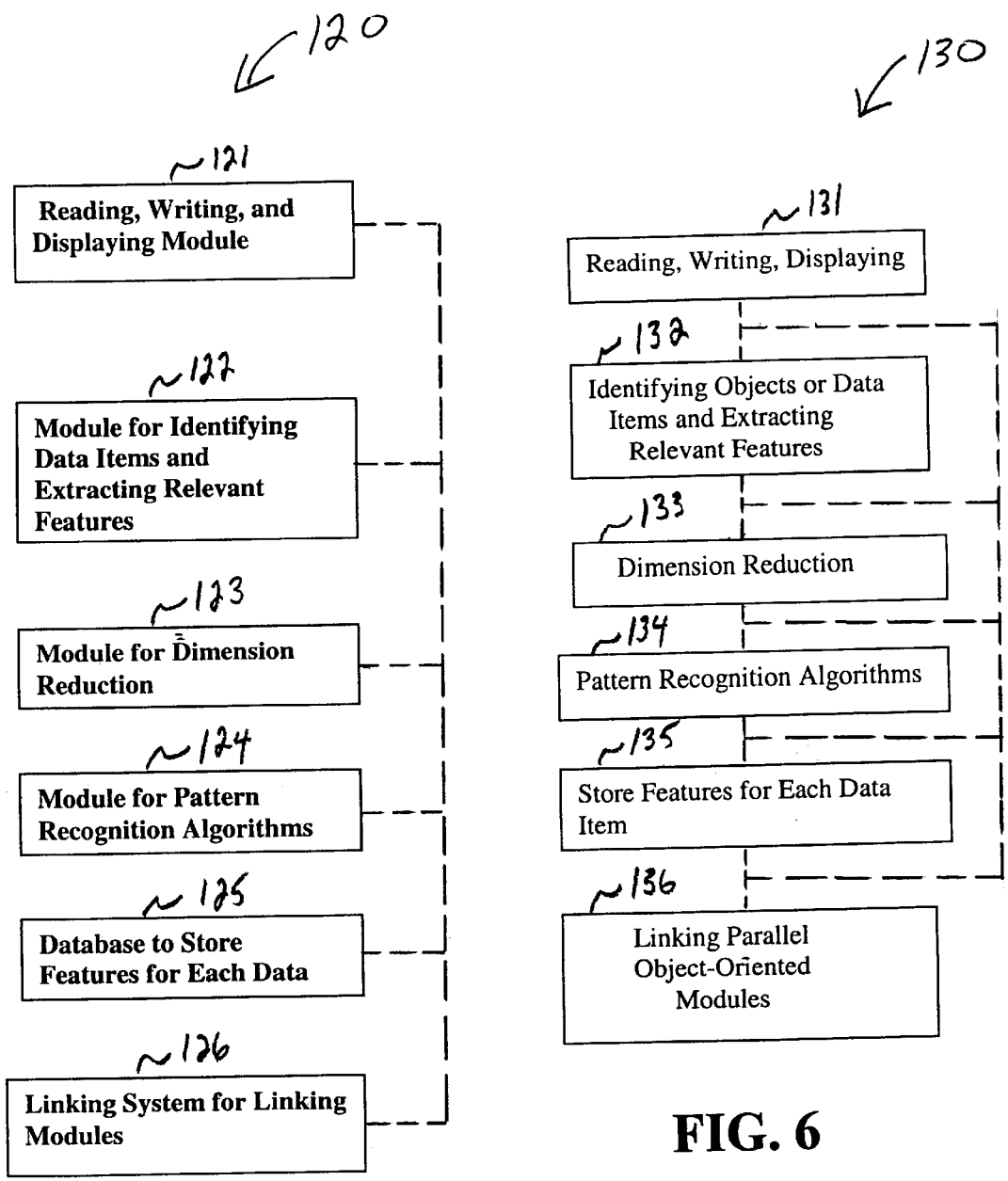
FIG. 5 is a flow chart showing modules that constitute another embodiment of the present invention.
FIG. 6 is a flow chart showing the steps of a method that is another embodiment of the present invention.

FIG. 5 is a flow chart 120 showing modules that constitute another embodiment of the present invention. The flow chart 120 shown in FIG. 5 includes the following modules: a parallel object-oriented reading and displaying module 121 for reading and displaying data in different formats, said data containing data items with features; a parallel object-oriented identifying module 122 for identifying data items and extracting relevant features for each data item (module 122 actually contains two modules, an identifying module and an extracting module); a parallel object-oriented dimension reduction module 123 for dimension reduction which reduces the number of features for a data item; a parallel object-oriented pattern recognition algorithms module 124 for pattern recognition; and a database 125 to store the features for each data item as it is extracted, wherein, the appropriate modules are linked as necessary using a scripting language in linking system 126.

It is to be understood that different combinations of modules are used in individual embodiments of the invention. For example, an embodiment of the customer relationship management system described above uses the following modules a parallel reading and displaying module 121 for reading and displaying data in different formats, said data containing data items with features; a parallel identifying module 122 for identifying data items; a parallel extracting module 122 for extracting relevant features for each data item; a parallel pattern recognition algorithms module 124 for pattern recognition; and a storage module 125 to store the features for each data item as it is extracted.

Another embodiment of the customer relationship management system includes the foregoing modules and module 126 for linking the parts of the data mining system. The system can also include a parallel dimension reduction module 123 for dimension reduction which reduces the number of features for a data item, and/or a parallel sampling module for sampling said data to reduce the number of data items, and/or a parallel multiresolution analysis module for performing a reversible transformation of said data into a coarser resolution, and/or a parallel removing noise module for removing noise from said data, and/or a parallel data fusion module for data fusion. The storage module can be a database.

FIG. 6 is a flow chart 130 showing the steps of a method that constitutes another embodiment of the present invention. The flow chart 130 shown in FIG. 6 illustrates an embodiment of a data mining system that includes the following steps: reading and displaying data files 131, said data files containing objects having relevant features; identifying said objects in said data files 132; extracting relevant features for each of said objects132; dimension reduction 133; recognizing patterns among said objects based upon said features134; storing features for each data item 135, and linking individual steps.

It is understood that different combinations of steps are used in individual embodiments of the invention. For example in an embodiment of a business data mining embodiment the following steps are used: reading and displaying data files 131, said data files containing objects having relevant features; identifying said objects in said data files 132; extracting relevant features for each of said objects 132; and recognizing patterns among said objects based upon said features 134.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A data mining system, comprising:
   a parallel reading and displaying module for reading and displaying data in different formats, said data containing data items with features;
   a parallel object identifying module for identifying said data items;
   a parallel feature extracting module for extracting at least one of said features for each of said data items;
   a parallel pattern recognition algorithms module for pattern recognition;
   a storage module to store at least one of said features for each of said data items as it is extracted, and
   a parallel linking module for linking said parallel object identifying module, said parallel feature extracting module, said parallel pattern recognition algorithms module, and said storage module.

2. The data mining system of claim 1, including a parallel dimension reduction module for dimension reduction which reduces the number of said features for each of said data items.

3. The data mining system of claim 1, wherein said storage module is a database.

4. The data mining system of claim 1, including a parallel sampling module for sampling said data to reduce the number of said data items.

5. The data mining system of claim 1, including a parallel multiresolution analysis module for performing a reversible transformation of said data into a coarser resolution.

6. The data mining system of claim 1, including a parallel noise removing module for removing noise from said data.

7. The data mining system of claim 1, including a parallel data fusion module for data fusion.

8. A parallel object-oriented data mining system, comprising:
   a parallel object-oriented reading and displaying module for reading and displaying data in different formats, said data containing data items with features;
   a parallel object-oriented identifying module for identifying said data items;
   a parallel object-oriented feature extracting module for extracting at least one of said features for each of said data items;
   a parallel object-oriented pattern recognition algorithms module for pattern recognition;
   a storage module to store at least one of said features for each of said data items as it is extracted, and
   a parallel object-oriented linking module for linking said parallel object-oriented identifying module, said parallel object-oriented extracting module, said parallel object-oriented pattern recognition algorithms module, and said storage module.

9. The data mining system of claim 8, including a parallel object-oriented dimension reduction module for dimension reduction which reduces the number of said features for each of said data items.

10. The data mining system of claim 8, including a parallel object-oriented sampling module for sampling said data to reduce the number of said data items.

11. The data mining system of claim 8, including a parallel object-oriented multiresolution analysis module for performing a reversible transformation of said data into a coarser resolution.

12. The data mining system of claim 8, including a parallel object-oriented removing noise module for removing noise from said data.

13. The data mining system of claim 8, including a parallel object-oriented data fusion module for data fusion.

14. The data mining system of claim 13 including wherein said parallel object-oriented linking module for linking said parallel object-oriented identifying module, said parallel object-oriented extracting module, said parallel object-oriented pattern recognition algorithms module, and said storage module, also links said database and utilizes a scripting language.

15. The data mining system of claim 8 wherein said storage module is a database.

16. A parallel object-oriented data mining system, comprising:
   parallel object-oriented reading and displaying means for reading and displaying data in different formats, said data containing data items with features;
   parallel object-oriented sampling means for sampling said data to reduce the number of data items;
   parallel object-oriented multiresolution analysis means for performing a reversible transformation of said data into a coarser resolution;
   parallel object-oriented noise removing means for removing noise from said data;
   parallel object-oriented data fusion means for data fusion;
   parallel object-oriented object identifying means for identifying data items;
   parallel object-oriented feature extracting means for extracting at least one of said features for each of the said data items;
   parallel object-oriented dimension reduction means for dimension reduction which reduces the number of features for a data item;

parallel object-oriented pattern recognition algorithms means for pattern recognition; and database means for storing features for each data item as it is extracted, wherein, the appropriate means are linked as necessary using a scripting language.

17. A data mining system for science, engineering, business and other applications, comprising:

a parallel object-oriented reading, writing, and displaying module for reading, writing, and displaying engineering, business and other data in different formats, said data containing data items from different sensors at different times under different conditions;

a parallel object-oriented sampling module for sampling said data and reducing the number of said data items;

a parallel object-oriented multiresolution analysis module for multiresolution analysis to perform a reversible transformation of said data into a coarser resolution using multi-resolution techniques;

a parallel object-oriented noise removal module for removing noise from said data;

a parallel object-oriented data fusion module for data fusion if said data is obtained from different sensors at different times under different conditions at different resolutions;

a parallel object-oriented object identifying module for identifying said data items in the fused, denoised, sampled, multi-resolution data;

a parallel object-oriented feature extracting module for extracting at least one of said features for each of said items from the said fused, denoised, sampled, multi-resolution data;

a parallel object-oriented dimension reduction module for dimension reduction which reduces the number of features for each of said data items;

a parallel object-oriented pattern recognition module using pattern recognition algorithms selected from the group consisting of decision trees, neural networks, k-nearest neighbor, k-means, or evolutionary algorithms; and a database to store said at least one of said features for each of said data items as it is extracted, after the number of features have been reduced, and as the data set grows in size, enabling easy access to subsets of data; wherein, all the appropriate modules are linked as necessary using a scripting language such as Python to provide a solution for data mining.

18. The data mining system of claim 17 wherein said parallel object-oriented multiresolution analysis module for multiresolution analysis to perform a reversible transformation of said data into a coarser resolution uses resolution techniques such as wavelets.

19. The data mining system of claim 17 wherein said parallel object-oriented noise removal module for removing noise from said data uses techniques selected from the group consisting of wavelet-based denoising, spatial filters or techniques based on partial differential equations.

20. The data mining system of claim 17 wherein said multi-resolution techniques are wavelets.

21. The data mining system of claim 17 wherein said denoising techniques are wavelet-based.

22. The data mining system of claim 17 wherein said denoising techniques are spatial filters.

23. The data mining system of claim 17 wherein said denoising techniques are techniques based on partial differential equations.

24. A method of data mining, comprising the steps of:

reading and displaying in parallel data files, said data files containing objects having at least one feature;

identifying in parallel said objects in said data files;

extracting in parallel said at least one feature for each of said objects; and recognizing in parallel patterns among said objects based upon said features.

25. The method of data mining of claim 23 including the step of sampling said data and reducing the number of said data items.

26. The method of data mining of claim 23 including the step of conducting multiresolution analysis to perform a reversible transformation of said data into a coarser resolution.

27. The method of data mining of claim 23 including the step of removing noise from said data.

28. The method of data mining of claim 23 including the step of conducting data fusion of said data.

29. The method of data mining of claim 23 including the step of conducting dimension reduction which reduces the number of features for one or more of said data items.

30. The method of data mining of claim 23 including the steps of sampling said data and reducing the number of said data items, conducting multiresolution analysis to perform a reversible transformation of said data into a coarser resolution, removing noise from said data, conducting data fusion of said data, and conducting dimension reduction which reduces the number of features for one or more of said data items.

31. A method of data mining, comprising the steps of:

reading and displaying data files using a parallel object-oriented reading and displaying module, said data files containing objects having at least one feature;

identifying said objects in said data files using a parallel object-oriented object identifying module;

extracting at least one feature for each of said objects using a parallel object-oriented feature extracting module; and recognizing patterns among said objects based on at least one feature using a parallel object-oriented pattern recognizing module.

32. A method of data mining, comprising the steps of:

reading, writing, and displaying a number of data files;

sampling said data files and reducing the number of said data files;

conducting multi-resolution analysis to perform a reversible transformation into a coarser resolution of said data files;

removing noise from said data files;

implementing data fusion of said data files;

identifying objects in said data files;

extracting at least one feature for each of said objects;

normalizing at least one feature of said objects;

reducing the dimension or number of at least one of said feature of said objects;

recognizing patterns among said objects using at least one of said feature;

displaying said data files and said objects and capturing feedback from scientists for validation;

storing at least one feature for each of said objects, after they have been extracted in said extracting step, reduced in number in said reducing step, used for pattern recognition in said recognizing patterns step, and displayed in said displaying step; and linking said foregoing steps.

33. A method of data mining, comprising the steps of:

reading, writing, and displaying scientific, engineering, business and other data in different formats using a parallel object-oriented reading, writing, and displaying module, said data containing data items;

sampling said data and reducing the number of said data items using a parallel object-oriented sampling module;

conducting multiresolution analysis to perform a reversible transformation of said data into a coarser resolution using a parallel object-oriented multiresolution module;

removing noise from said data using a parallel object-oriented removing noise module;

conducting data fusion using a parallel object-oriented data fusion module; when said data is obtained from different sensors at different times under different conditions at different resolutions;

identifying objects or data items in said data and extracting at least one feature for each of said data items using a parallel object-oriented identifying objects module;

conducting dimension reduction which reduces the number of said features for one or more of said data items using a parallel object-oriented conducting dimension reduction module;

implementing pattern recognition algorithms using a parallel object-oriented implementing pattern recognition algorithms module;

using a database to store at least one feature for each of said data items extracted after the number said features have been reduced, and as said data items grows in size, enabling easy access to subsets of said data; and linking appropriate foregoing parallel object-oriented modules as necessary using a scripting language.

* * * * *